Feb. 9, 1937.  C. BÖRNER  2,070,252

PROCESS AND APPARATUS FOR DRYING TUBING

Filed Sept. 11, 1934  2 Sheets—Sheet 1

INVENTOR
Christian Börner
BY
Watson, Bristol, Johnson & Leavenworth
ATTORNEYS

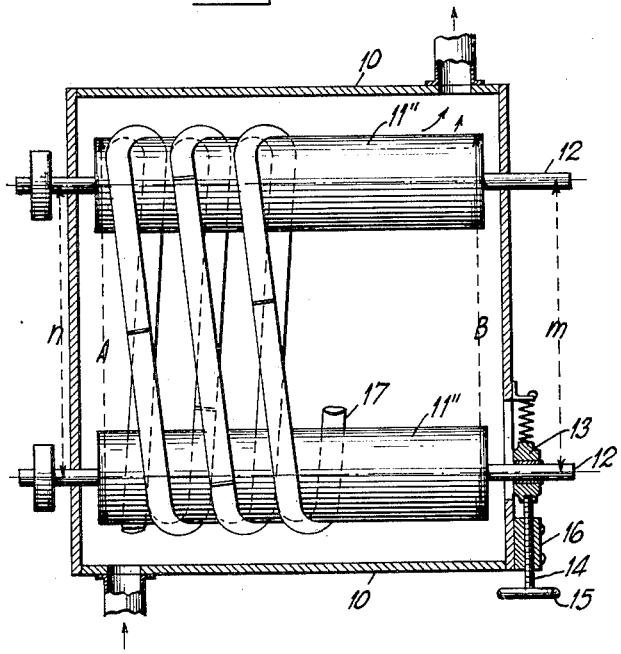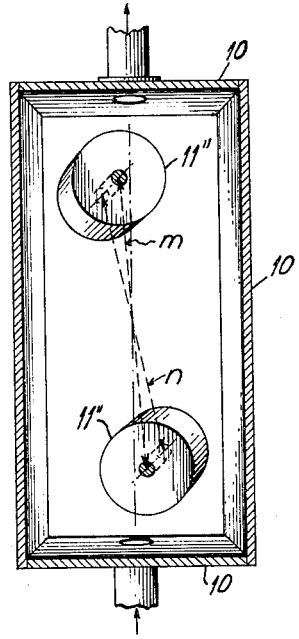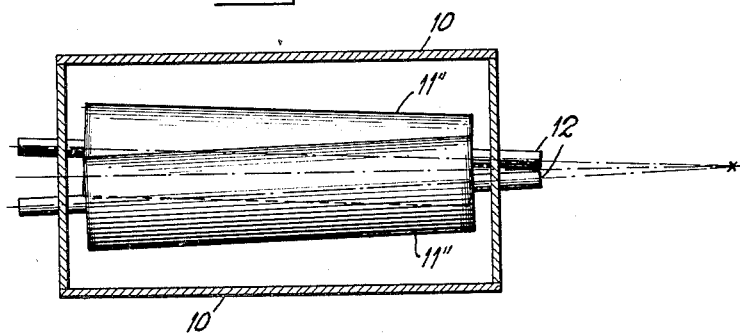

Patented Feb. 9, 1937

2,070,252

UNITED STATES PATENT OFFICE 2,070,252

PROCESS AND APPARATUS FOR DRYING TUBING

Christian Börner, Bomlitz, near Walsrode, Germany, assignor to Sylvania Industrial Corporation, Fredericksburg, Va., a corporation of Virginia Application September 11, 1934, Serial No. 743,589

10 Claims. (Cl. 34—24)

The invention relates in general to the drying of seamless, flexible tubing and, in particular, to an improved process and apparatus for drying artificial sausage casing formed from viscose solutions and the like.

Heretofore, it has been customary in drying seamless, flexible tubing such as artificial sausage casings formed from viscose solutions and the like to pass the tubing over a plurality of spaced parallel rollers, the tubing being subjected while on the roller to a drying atmosphere. As the tubing shrinks, it is subjected to longitudinal stretching, in consequence of which definite longitudinal creases are produced therein. Drying such tubing under tension has a further disadvantage in that it increases the orientation of the micellae. The longitudinal orientation of the micellae results in the tubing showing a much smaller tensile strength transverse of the tubing than longitudinally thereof, and a noticeable decrease in the elasticity and expansibility.

When sausage casings are stuffed, the tension exerted thereon transverse of the tubing is at least as great as, if not greater than, the longitudinal tension. In consequence of the orientation of the micellae and the presence of definite longitudinal creases, the tubing ruptures easily and shows a tendency to split along such creases when stuffed or linked in the preparation of flexible casings. Likewise, during cooking, such casings show a substantial tendency towards bursting as a result of which the meat stuffing extrudes and the sausage curls into an unsightly shape.

Accordingly, it is the general object of the invention to provide an improved process and apparatus for drying seamless, flexible tubing whereby there may be produced tubing substantially free from the above mentioned disadvantages and having a high resistance to transverse tension as well as to longitudinal tension.

It is another object of the invention to provide a process and apparatus for drying artificial sausage casing formed from viscose solutions and the like without the production of definite longitudinal creases therein and without increasing the original orientation or grain of the micellar structure.

It is a specific object of the invention to provide an apparatus for drying artificial sausage casings formed from viscose solutions and the like characterized by means for subjecting the casings to a drying atmosphere while passing the tubing therethrough in a path which becomes progressively shorter as the tubing is advanced, thus enabling the tubing to shrink longitudinally during the drying without being subjected to a substantial longitudinal stretching.

The invention accordingly comprises a process having the several steps and the relation of one or more of such steps in respect to each of the others, and an apparatus having the features of construction, combination of elements and arrangement of parts which are exemplified in the following detailed disclosure, and the scope of the application of which will be indicated in the claims.

For a more complete understanding of the nature and objects of the invention, reference should be had to the attached drawings, in which:

Fig. 5 is a front elevation, partly in section, of another embodiment of the apparatus of the invention.

Fig. 6 is an end view in perspective of the apparatus of Fig. 5, the end wall being removed.

Fig. 7 is a top plan view of the apparatus of Fig. 5, the top being removed.

In the practice of the invention, the process comprises passing seamless, flexible tubing such, for example, as artificial sausage casing formed from viscose solutions and the like, through a drying atmosphere in a circuitous or helical-like path the successive circuits or convolutions of which become progressively shorter as the tubing is advanced. The decrease in the path traveled is so correlated with the shrinkage of the tubing that the tubing is enabled to shrink without being subjected to a substantial longitudinal stretching.

The apparatus of the invention comprises in general a heating chamber having spaced rotatable rollers mounted therein and about which the tubing is adapted to be advanced. The rollers are constructed or arranged to define a helical-like path the successive convolutions of which become progressively shorter as the tubing is advanced about the rollers, which enables the tubing to shrink longitudinally during the drying without being subjected to a substantial longitudinal stretching.

Figure 1:
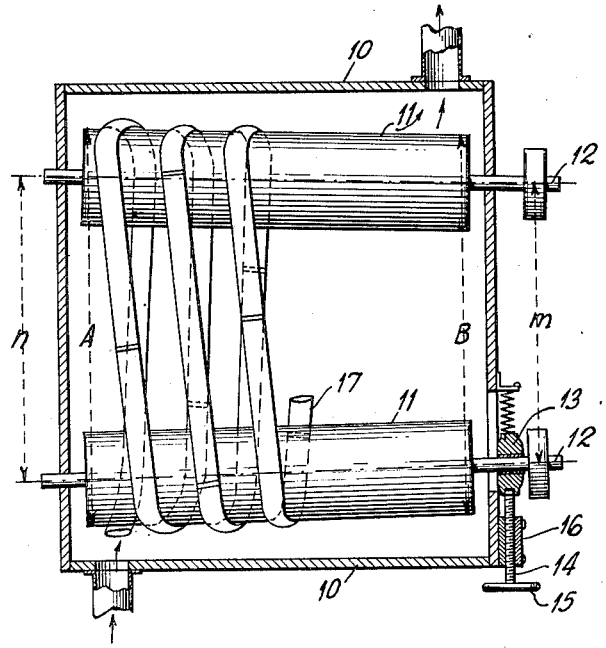
Fig. 1 is a front elevation, partly in section, of one embodiment of a suitable apparatus for drying seamless, flexible tubing in accordance with a modification of the process of the invention.
Figure 2:
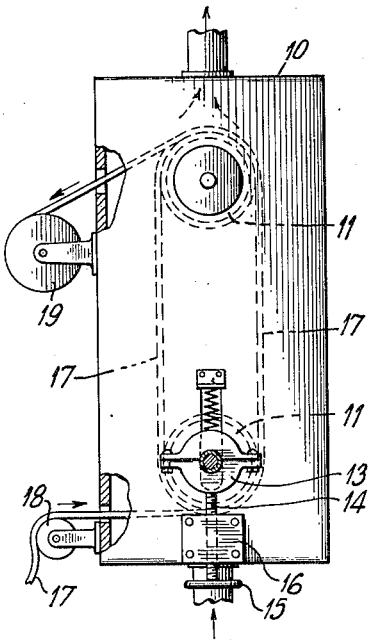
Fig. 2 is an end view of the apparatus of Fig. 1.
Figure 3:
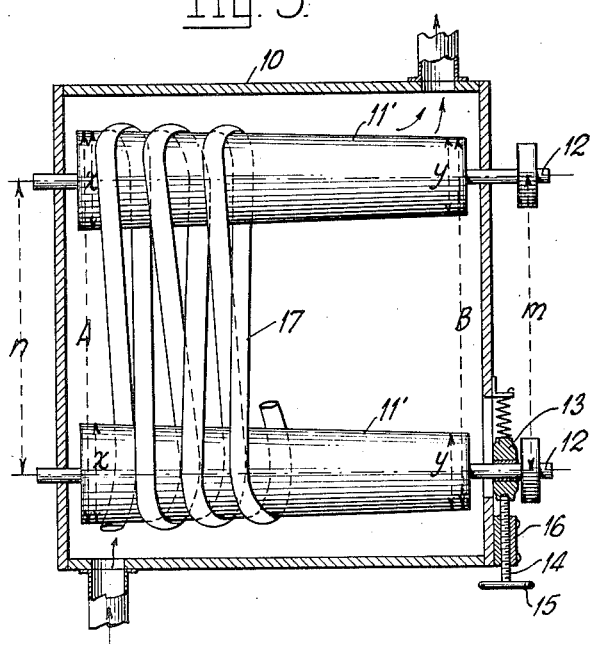
Fig. 3 is a front elevation, partly in section, of another embodiment of a suitable apparatus for drying seamless, flexible tubing in accordance with another modification of the process of the invention.
Figure 4:
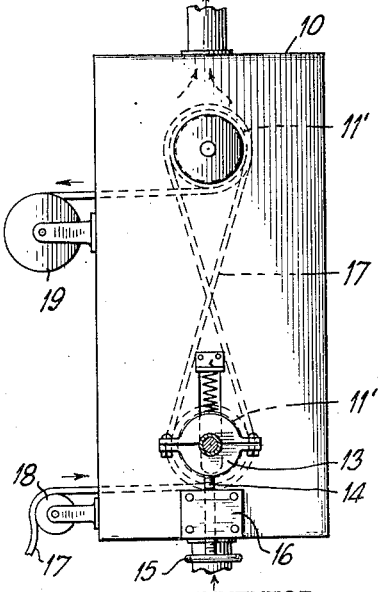
Fig. 4 is an end view of the apparatus of Fig. 3.

The expression "helical-like" is used generically to denote the path of the tubing as it progresses through the drying chamber and it is meant to include the flattened helix shown in Figs. 1, 2, 5 and 6 and the interweaving helix illustrated in Figs. 3 and 4.

The seamless, flexible tubing for which the process and apparatus of the invention are designed comprises a product such as that obtained by extruding a suitable solution of a tube-forming material through an annular orifice in the form of seamless tubing, and coagulating, purifying and conditioning the tubing. The process and apparatus are applicable for drying tubing formed of various non-fibrous, cellulosic materials such, for example, as cellulose hydrate, cellulose esters, cellulose ethers, and other plastic, non-fibrous materials such as synthetic resins, gelatin, casein and the like, all of which are characterized by shrinking upon drying as a result of the loss of solvent or swelling agent.

In the modifications of the drying apparatus which are illustrated, there is provided a heating chamber 10 preferably rectangular in shape through which heated air may be passed and means for conveying the tubing therethrough comprising spaced rotatable rollers positioned with their axes lengthwise of the chamber 10 and so constructed and/or disposed that the distance between their arcuate surfaces decreases progressively toward the dry end of the chamber 10. The shortening of the path travelled by the tubing may be accomplished, as shown in Fig. 1 and Fig. 2, by employing spaced cylindrical rollers 11 having a uniform diameter, but disposed with their axes 12 inclined toward one another at the dry end of the chamber, so that the distance "$n$" between the wet ends of the rollers is greater than the distance "$m$" between the dry ends of the rollers, as a result of which the path around the rollers at A is greater than the path at B.

In the modification shown in Fig. 3 and Fig. 4, a progressively shortened path is obtained by employing tapered rollers 11' and spacing the rollers so that their longitudinal axes 12 are substantially parallel to one another. The diameter X of the rollers at the wet ends is greater than the diameter Y thereof at the dry ends thereby providing that the path at A is greater than the path at B.

A preferred embodiment of the apparatus is shown in Figs. 5, 6 and 7, in which the rollers 11" are mounted parallel to the floor of the apparatus, the longitudinal axes 12 converging on a common vertical line as shown in Fig. 6, and not to a common point as in the apparatus of Fig. 1. Viewing the apparatus from above, it is noted in Fig. 7 that the axes of the rollers 11" are nearer each other at the dry end of the apparatus than at the wet end. Thus, the distance "$n$" is greater than the distance "$m$", in consequence of which the path traversed by the tubing in passing over the rollers at A is greater than at B and progressively decreases as the tubing advances toward the dry end of the apparatus.

It has been found advisable that the rollers 11, 11' and 11" used for conveying the tubing through the drying apparatus should have a large diameter relative to the diameter of the tubing. The ratio between the diameter of the tubing and the diameter of the conveying roller should be not substantially less than 1:4 and preferably above 1:10. Employing a relatively large roller, the natural plastic condition of the casing takes care of any unequal stresses produced at the edges of the flattened tubing so that the tubing advances down the roller without successive turns of the tubing overlapping one another.

Means may be provided for varying the distance between the ends of the rollers in any modification of the apparatus. For example, as shown in the drawings, the axle of one or both of the rollers may be mounted in a bearing 13, the height of which is adjustable by means of a screw 14 having a hand wheel 15. The screw 14 pierces a plate 16 which is mounted integrally with the wall of the chamber 10. The movable axle passes through a suitable slot cut in the wall of the chamber 10, the bearing being held rigid and in position by known means. By adjusting the height of the bearing 13, the distance "$m$" may be varied so as to change the ratio of "$m$" to "$n$" and thus to vary the path which much be travelled by the tubing in passing about the rollers. The path which the tubing traverses through the drying apparatus becomes progressively shorter as the tubing becomes drier and the tubing is able to shrink without being subjected to a substantial longitudinal stretching.

The tubing 17 may be introduced into the drying chamber over a preliminary roller 18 and through a suitable opening in the wall of the chamber and then may be passed about the rollers 11 in a helical manner as shown in Figs. 1 and 2 or over the rollers 11' in an interweaving helical manner as shown in Figs. 3 and 4. The tubing is thus advanced to the dry end of the chamber and is withdrawn from the apparatus through a second suitable opening in the chamber wall and may be wound upon a reel 19 or cut into lengths as desired.

It is obvious that various modifications may be made in the drying apparatus. For example, there may be employed three or more rollers arranged to define a path of the character described. The driving mechanism for the conveying rollers 11, 11' and 11" is such that the speeds of the rollers are synchronized. In the now preferred practice, it has been found advantageous to employ conveying rollers having a framework of wood covered with cloth, the rollers being hollow so that the heated air may be passed therethrough.

The tubing may be dried in a flattened condition or it may be inflated with air and maintained in an inflated condition during its passage through the drying apparatus. When dried in an inflated condition, the longitudinal axis of the tubing is rotated as the tubing passes from one supporting roller to the next, thus preventing the formation of definite longitudinal creases.

While the drawings show the tubing as being continuous, it is obvious that the apparatus may be employed for drying tubing which has been cut into sections during the process of manufacture. The sections are fastened together end to end by means of suitable clips and the tubing is then fed into the apparatus and dried in the manner herein described. If desired, the sections may be inflated one by one as they are attached, in which case a substantial rotation of the longitudinal axis of the tubing will occur as in the case of a continuous length which has been inflated.

Since certain changes in carrying out the above process and apparatus and certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. In the claims, the term "solution" as used with reference to the tube-forming material is intended to include both true solutions thereof as well as colloidal solutions of mixtures in which the material is substantially uniformly dispersed.

I claim:

1. In an apparatus for drying seamless, flexible tubing, the combination of a heating chamber having a wet and a dry end, means for conveying the tubing through said chamber comprising spaced rotatable rollers, said rollers tapering uniformly from the wet to the dry end of the chamber and defining a circuitous path, the successive circuits of which become progressively shorter as the tubing is advanced about the rollers, and means for adjusting and fixing the space between said rollers for correlating the length of the path with the shrinkage of the tubing so that the tubing is allowed to shrink without being subjected to a substantial longitudinal stretching.

2. In an apparatus for drying seamless, flexible tubing formed of a non-fibrous cellulosic material, the combination of a heating chamber and means for conveying the tubing through said chamber comprising spaced rotatable rollers, said rollers having the general shape of a truncated cone and disposed so as to taper in the same direction, said rollers defining a path which becomes progressively shorter as the tubing is advanced about the rollers.

3. In an apparatus for drying seamless, flexible tubing formed of a non-fibrous cellulosic material, the combination of a heating chamber, means for conveying the tubing through said chamber comprising spaced rotatable rollers, and means for adjusting the space between the ends of said rollers, said rollers having the general shape of a truncated cone and disposed so as to taper in the same direction, said rollers defining a path which becomes progressively shorter as the tubing is advanced about the rollers.

4. In an apparatus for drying seamless, flexible tubing adapted for use as sausage casings, the combination of a heating chamber having a wet end and a dry end and means for conveying the tubing through said chamber comprising spaced rotatable rollers, the distance between the axes of said rollers being greater at the wet end, thus defining a helical-like path, the successive convolutions of which become progressively shorter as the tubing is advanced about the rollers, whereby the tubing is allowed to shrink without being subjected to a substantial longitudinal stretching.

5. A process for drying seamless, flexible tubing formed of a non-fibrous cellulosic material and adapted for use as sausage casing comprising passing the tubing through a drying atmosphere in a helical-like path, the successive convolutions of which become progressively shorter as the tubing becomes drier and correlating the length of the path with the shrinkage of the tubing to permit the tubing to shrink without subjecting it to a substantial longitudinal tension.

6. A process for drying seamless, flexible tubing comprising inflating the tubing, passing the inflated tubing through a drying atmosphere in a circuitous path the successive circuits of which become progressively shorter as the tubing becomes drier and correlating the length of the path with the shrinkage of the tubing to permit the tubing to shrink without subjecting it to a substantial longitudinal tension.

7. A process for drying seamless, flexible tubing comprising inflating the tubing, passing the tubing through a drying atmosphere in a circuitous path the successive circuits of which become progressively shorter as the tubing becomes drier, rotating the longitudinal axis of the tubing and correlating the length of the path with the shrinkage of the tubing to permit the tubing to shrink without subjecting it to a substantial longitudinal tension.

8. A process for drying seamless, flexible tubing which has been severed into sections during manufacture, comprising connecting the sections end to end, passing the connected sections through a drying atmosphere in a circuitous path the successive circuits of which become progressively shorter as the tubing becomes drier and correlating the length of the path with the shrinkage of the tubing to permit the tubing to shrink without subjecting it to a substantial longitudinal tension.

9. A process for drying seamless, flexible tubing which has been severed into sections during manufacture comprising inflating the sections and connecting the inflated sections end to end, passing the tubing through a drying atmosphere in a circuitous path, the successive circuits of which become progressively shorter as the tubing becomes drier, rotating the longitudinal axis of the tubing and correlating the length of the path with the shrinkage of the tubing to permit the tubing to shrink without subjecting it to a substantial longitudinal tension.

10. A process for drying sausage casing formed of a non-fibrous cellulosic material, comprising inflating the casing, passing the inflated casing through a drying atmosphere in a circuitous path the successive circuits of which become progressively shorter as the casing becomes drier, rotating the longitudinal axis of the casing and correlating the length of the path with the shrinkage of the casing to permit the casing to shrink without subjecting it to a substantial longitudinal tension.

CHRISTIAN BÖRNER.